(12) United States Patent
Asumu et al.

(10) Patent No.: US 11,164,564 B2
(45) Date of Patent: *Nov. 2, 2021

(54) AUGMENTED INTENT AND ENTITY EXTRACTION USING PATTERN RECOGNITION INTERSTITIAL REGULAR EXPRESSIONS

(71) Applicant: Bank of America Corporation, Charlotte, NC (US)

(72) Inventors: Donatus Asumu, McKinney, TX (US); Bhargav Aditya Ayyagari, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 15 days.

This patent is subject to a terminal disclaimer.

(21) Appl. No.: 16/900,280

(22) Filed: Jun. 12, 2020

(65) Prior Publication Data

US 2020/0312304 A1 Oct. 1, 2020

Related U.S. Application Data

(63) Continuation of application No. 16/210,723, filed on Dec. 5, 2018, now Pat. No. 10,720,150.

(51) Int. Cl.
*G10L 25/51* (2013.01)
*G10L 15/08* (2006.01)
*G10L 15/22* (2006.01)
*G06N 20/00* (2019.01)

(52) U.S. Cl.
CPC .............. *G10L 15/08* (2013.01); *G06N 20/00* (2019.01); *G10L 15/22* (2013.01); *G10L 25/51* (2013.01); *G10L 2015/225* (2013.01)

(58) Field of Classification Search
CPC ..... G10L 15/08; G10L 15/22; G10L 15/1822; G10L 2015/225; G10L 25/51; G06N 20/00; G06N 7/005
USPC .......................................................... 704/240
See application file for complete search history.

(56) References Cited

U.S. PATENT DOCUMENTS

| 7,590,584 | B1 | 9/2009 | Stokes et al. |
| 8,600,830 | B2 | 12/2013 | Hoffberg |
| 9,818,136 | B1 | 11/2017 | Hoffberg |
| 10,007,662 | B2 | 6/2018 | Stoytchev et al. |
| 10,291,646 | B2 | 5/2019 | Stolarz et al. |
| 10,328,329 | B2 | 6/2019 | Hansen |

(Continued)

*Primary Examiner* — Susan I McFadden
(74) *Attorney, Agent, or Firm* — Michael A. Springs

(57) ABSTRACT

According to certain embodiments, a system comprises interface circuitry and processing circuitry. The processing circuitry receives an input via the interface circuitry. The input is based on an utterance of a user, and the processing circuitry uses a probabilistic engine to determine one or more candidate intents associated with the utterance. The processing circuitry determines a number of the one or more candidate intents that exceed a threshold. If the number of candidate intents that exceed the threshold does not equal one, the processing circuitry uses a deterministic engine to compare the input to a set of regular expression patterns. If the input matches one of the regular expression patterns, the processing circuitry uses the matching regular expression pattern to determine the intent of the utterance. The interface circuitry communicates the intent of the utterance as an output.

20 Claims, 11 Drawing Sheets

(56) References Cited

U.S. PATENT DOCUMENTS

| | | |
|---|---|---|
| 10,404,710 B2 | 9/2019 | Self et al. |
| 10,419,475 B2 | 9/2019 | Stolarz et al. |
| 10,467,261 B1 | 11/2019 | Doyle |
| 10,482,874 B2 | 11/2019 | Thomson et al. |
| 10,592,604 B2 | 3/2020 | Pusateri et al. |
| 10,720,150 B2 * | 7/2020 | Asumu ............ G10L 25/51 |
| 10,854,191 B1 * | 12/2020 | Geramifard ......... G10L 15/16 |
| 10,909,331 B2 * | 2/2021 | Peitz ............... G10L 15/16 |
| 2019/0278841 A1 | 9/2019 | Pusateri et al. |
| 2020/0051547 A1 | 2/2020 | Shanmugam et al. |

* cited by examiner

AUGMENTED INTENT AND ENTITY EXTRACTION USING PATTERN RECOGNITION INTERSTITIAL REGULAR EXPRESSIONS

CROSS-REFERENCE TO RELATED APPLICATIONS

This application is a continuation of U.S. patent application Ser. No. 16/210,723 filed Dec. 5, 2018, by Donatus Asumu et al., and entitled "AUGMENTED INTENT AND ENTITY EXTRACTION USING PATTERN RECOGNITION INTERSTITIAL REGULAR EXPRESSIONS," which is incorporated herein by reference.

TECHNICAL FIELD

Certain embodiments relate, in general, to machine learning and, more specifically, to augmented intent and entity extraction using pattern recognition interstitial regular expressions.

BACKGROUND

A machine learning system may be configured to use one or more machine learning techniques (e.g., classification techniques, clustering techniques, regression techniques, structured prediction techniques, etc.) and/or models (e.g., statistical models, neural networks, support vector machines, decision trees, graphical models, etc.) for processing data. Machine learning systems are used to process data arising in a wide variety of applications across different domains including, but not limited to, text analysis, machine translation, speech processing, audio processing, image processing, visual object recognition, and the analysis of biological data.

SUMMARY

According to certain embodiments, a system is disclosed for use in conjunction with machine learning modules. The system comprises one or more interfaces and processing circuitry. The processing circuitry further comprises a first machine learning module and a second machine learning module. The processing circuitry is operable to receive an input based on the utterance of a user via the one or more interfaces and to use a probabilistic engine of the first machine learning module to process the input according to a first machine learning process. The first machine learning process determines one or more candidate intents associated with the utterance based on probabilistic logic. The processing circuitry is further operable to determine a number of the one or more candidate intents that exceed a threshold. If the processing circuitry determines that the number of the one or more candidate intents that exceed the threshold does not equal one, the processing circuitry is further operable to use a deterministic engine of the second machine learning module to process the input according to a second machine learning process. The second machine learning process is operable to use deterministic logic to compare the input to a set of regular expression patterns, and, if the second machine learning process determines that the input matches one of the regular expression patterns, use the matching regular expression pattern to determine the intent of the utterance. The one or more interfaces are further operable to communicate the intent of the utterance as an output.

According to certain embodiments, a method is disclosed for use in conjunction with machine learning. The method comprises using interface circuitry to receive an input based on an utterance of a user. The method further comprises using processing circuitry to process the input according to a first machine learning process. The first machine learning process comprises probabilistic logic that determines one or more candidate intents associated with the utterance. If the processing circuitry determines that the number of the one or more candidate intents that exceed the threshold does not equal one, the method further comprises processing the input according to a second machine learning process. The second machine learning process comprises deterministic logic comprising comparing the input to a set of regular expression patterns. If the second machine learning process determines that the input matches one of the regular expression patterns, the second machine learning process further comprises using the matching regular expression pattern to determine the intent of the utterance. The method further comprises using the interface circuitry to communicate the intent of the utterance as an output.

According to certain embodiments, one or more non-transitory computer-readable media are disclosed. The non-transitory computer-readable media comprise logic that, when executed by processing circuitry, cause the processing circuitry to receive an input based on the utterance of a user and process the input according to a first machine learning process. The first machine learning process comprises probabilistic logic that determines one or more candidate intents associated with the utterance. The logic causes the processing circuitry to determine a number of the one or more candidate intents associated with the utterance, and, in response to determining that the number of the one or more candidate intents that exceed the threshold does not equal one, process the input according to a second machine learning process. The second machine learning process comprises logic that compares the input to a set of regular expression patterns, and, in response to determining that the input matches one of the regular expression patterns, uses the matching regular expression pattern to determine the intent of the utterance. The logic then causes the processing circuitry to communicate the intent of the utterance as an output.

Certain embodiments of the above-described system, method, and/or logic may each include additional features, such as any one or more of the following features:

In some embodiments, the one or more interfaces receive a second input based on the second utterance of a second user. The processing circuitry is further operable to process the second input according to the first machine learning process to determine one or more candidate second intents associated with the second utterance and determine a number of the one or more candidate second intents that exceed the threshold. If the processing circuitry determines that the number of the one or more candidate second intents that exceed the threshold equals one, the processing circuitry is further operable to select the candidate second intent that exceeds the threshold as the second intent. If the processing circuitry determines that the number of the one or more candidate second intents that exceed the threshold does not equal one, the processing circuitry is further operable to process the second input according to the second machine learning process. The one or more interfaces are further operable to communicate the second intent as a second output.

In some embodiments, the second machine learning process comprises deterministic logic that compares the second input to the set of regular expression patterns, and, if the second machine learning process determines that the second input does not match any of the regular expression patterns, communicates the second input and an indication that the second input includes an ambiguity to an administrator.

In some embodiments, the processing circuitry is further operable to receive a new regular expression pattern based on the second input from the administrator and add the new regular expression pattern to the set of regular expression patterns.

In some embodiments, the processing circuitry is further operable to determine whether to provide the new regular expression pattern as feedback to the probabilistic logic of the first machine learning process. The new regular expression pattern is provided as feedback or prevented from being provided as feedback to the probabilistic logic of the first machine learning process based on the determination.

In some embodiments, the processing circuitry is further operable to determine whether to provide the new regular expression pattern as feedback based on performing a cross-validation analysis indicating a likelihood of the new regular expression pattern improving the accuracy of the first machine learning process.

In some embodiments, the second machine learning process further comprises conditional random field logic and the second machine learning process causes the input to be compared to the set of regular expression patterns based on a failure of the conditional random field logic to determine the intent of the input according to a pre-determined confidence level.

Certain embodiments of the present disclosure may include one or more technical advantages. A technical advantage of some embodiments includes using probabilistic logic to efficiently determine the intent of a user input having a high degree of certainty. A technical advantage of some embodiments includes using deterministic logic to fill gaps when the probabilistic logic is unable to determine the intent of the user's input with a sufficient degree of certainty. For example, probabilistic logic may yield an ambiguous result if none of the candidate intents satisfy a threshold level of certainty, or if multiple candidate intents exceed the threshold such that it may be unclear which one to select. In some embodiments, the deterministic logic may compare the input to a set of existing regular expression patterns. If the user input matches one of the existing regular expression patterns, the matching regular expression pattern can be used to determine and output the user's intent. If the user input does not match one of the existing regular expression patterns, an ambiguity can be communicated to an administrator so that a new regular expression pattern can be created. Thus, certain embodiments may reduce the risk of outputting an incorrect intent where there exists ambiguity due to syntactic variations.

Some embodiments may benefit from some, none, or all of these technical advantages. Other technical advantages may be readily ascertained by one of ordinary skill in the art.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Embodiments of the present invention are described in FIGS. 1-11 of the drawings, like numerals being used for like and corresponding parts of the various drawings.

Data-driven machine learning and artificial intelligence algorithms may be used in various intent detection and entity extraction processes. Together, these processes enable the determination of both a customer's intent and the data associated with that intent (also known as the entities). Intent and entity extraction are the final outcomes of the probabilistic and machine learning algorithms applied to large sets of customer utterances (e.g., training data) in order to drive downstream processes that effect the desired outcome for the customer. These probabilistic approaches to machine learning in natural language processing generate associations between groups of utterances and the semantics of those utterances. The relationships are formed through a process of training that classifies utterances into one of several pre-defined intents. While these probabilistic methods can be tuned to a high degree of accuracy, there exist instances where the proximity of syntactic variations across utterances exceed the resolving power of a probabilistic machine learning approach.

To the extent that the learning process is probabilistic, the relationship between the entities that constitute each utterance and the intent represented by the utterance will sometimes lead to conflicts and ambiguity. Conflicts result when machine learning is unable to discriminate between utterances, resulting in the wrong intent for a given utterance. Ambiguity results when the score for association between an utterance and all available intents falls below the acceptance threshold score. Inability to clearly resolve between two or more possible intents when presented with a user utterance can create the need for human intervention. First, additional utterance training data is required—increasing the training footprint of the system. Second, additional tuning is required since the injection of new training data carries the possibility of detuning existing utterance-to-intent relationships that have been established by current training. This results in an update-tune-validate loop that is time consuming in human and machine resources.

Certain embodiments of the present disclosure address the interstitial elements of machine learning and tuning for classes of utterances that are resistant to a data-driven learning approach. To counter issues of conflict and ambiguity, a pattern-based approach may be implemented that encodes the meaning of the utterance directly within the syntax of the utterance. This approach may be semi-automated to create regular expressions using a simple user interface that incorporates an end user to identify intent and entities in problematic utterances.

Figure 1:
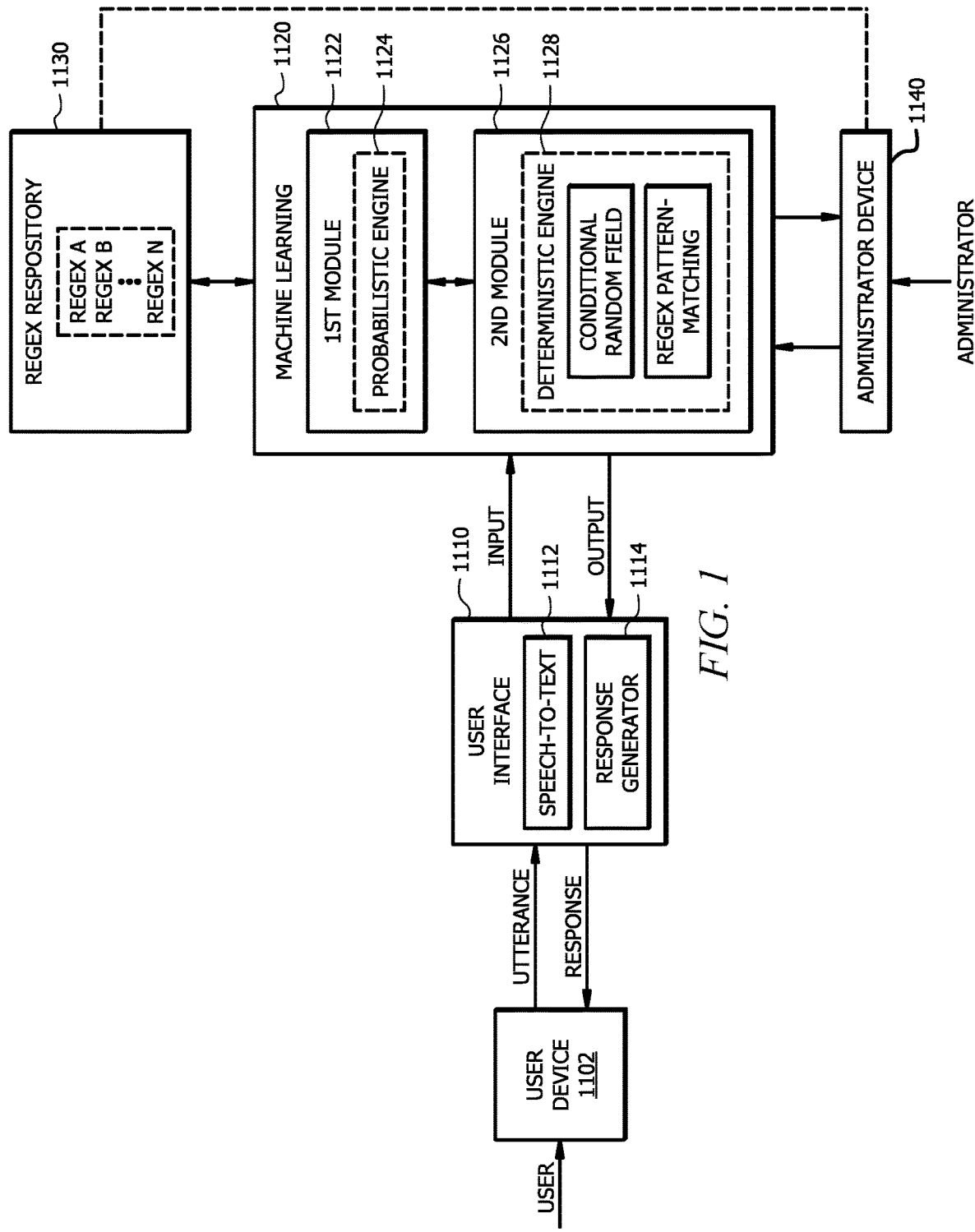
FIG. 1 illustrates an example of a computer network configured to determine an intent of an utterance based on machine learning, in accordance with certain embodiments.

FIG. 1 illustrates an example of components that may be included in the computer network and that may facilitate determining an intent associated with an utterance, in accordance with certain embodiments. In the example of FIG. 1, the computer network includes one or more of user device(s) 1102, user interface(s) 1110, machine learning module(s) 1120, regex repository(ies) 1130, and/or administrator device(s) 1140. In general, user interface 1110 receives an utterance of a user via user device 1102. User interface 1110 then provides the utterance as an input to machine learning module 1120. Machine learning module 1120 determines an intent associated with the utterance, in some cases based on information received from regex repository 1130 and/or administrator device 1140, and provides the intent as an output to user interface 1110. User interface 1110 generates a response to the intent and provides the response to the user via user device 1102.

User device 1102 is a non-limiting term that generally refers to equipment that a user employs in order to provide an utterance and/or to receive a response to an utterance. As an example, a user may be a customer of an enterprise, such as a financial institution, the utterance may request information from the enterprise, such as "what is my account balance," and the response may provide the requested information, such as "your account balance is $X." Examples of user device 1102 include a personal computer, a laptop, a tablet computer, a smartphone, a mobile phone, a handheld device, a wireless device, a wearable device, etc. User device 1102 may include any suitable user interfaces, such as one or more graphical user interfaces (GUIs), displays, buttons, printers, microphones, speakers, cameras, scanners, credit card readers, check readers, and so on. In certain embodiments, user device 1102 may receive the utterance in speech form via a microphone and may provide the utterance to user interface 1110 in audio form (e.g., according to a WAV, MP3, or other audio format). In certain embodiments, user device 1102 may receive the utterance in text form (e.g., via a keyboard or touchscreen) and may provide the utterance to user interface 1110 in text form. Similarly, user device 1102 may receive the response from user interface 1110 in audio or text form and may provide the response to the user, for example, via a speaker or display screen. Other embodiments may use other types of input and output, such as video.

In certain embodiments, user interface 1110 may receive the utterance from user device 1102, for example, in speech or text form and may provide the utterance as an input to machine learning module 1120. In certain embodiments, prior to inputting the utterance into machine learning module 1120, user interface 1110 may format the utterance. For example, if user interface 1110 receives the utterance in speech form, user interface 1110 may convert the utterance to text form using a speech-to-text subsystem 1112. User 1110 may receive an output from machine learning module 1120 indicating the intent of the utterance. Continuing with the example described above, the output received from machine learning module 1120 may indicate that the user wishes to obtain an account balance. User interface 1110 may include a response generator 1114 that may generate a response to the utterance, for example, by retrieving the account balance from internal memory or an external database, and may communicate the response to the user via user device 1102.

Although FIG. 1 illustrates one user interface 1110, in other embodiments, the functionality may be distributed among multiple user interfaces 1110. For example, a first user interface 1110 may receive the utterance from user device 1102, generate the input based on the utterance (e.g., perform speech-to-text conversion, if needed), and provide the input to machine learning module 1120. A second user interface 1110 may receive the output from machine learning module 1120, generate the response, and provide the response to user device 1102. Additionally, although FIG. 1 illustrates user interface 1110 as separate from user device 1102 and machine learning module 1120, in other embodiments, some or all of the functionality of user interface 1110 may be included in the same apparatus as user device 1102 and/or machine learning module 1120.

Machine learning module 1120 may be implemented using a server, a cloud-based system, or other suitable system. In certain embodiments, machine learning module 1120 comprises a first machine learning module 1122 and a second machine learning module 1126. In certain embodiments, first machine learning module 1122 performs a first machine learning process, such as that described below with respect to step 1004 of FIG. 3, and second machine learning module 1128 performs a second machine learning process, such as that described with respect to step 1018 of FIG. 3. In the example of FIG. 1, the first machine learning module 1122 comprises a probabilistic engine 1124 which uses probabilistic logic to determine the intent of the utterance. The second machine learning module 1126 comprises a deterministic engine 1128 which uses conditional random field (CRF) expressions and/or regular expression (REGEX) patterns to determine the intent of the utterance.

In certain embodiments, deterministic engine 1128 obtains REGEX patterns from REGEX repository 1130. In certain embodiments, REGEX repository 1130 may comprise a database (which may be internal or external to machine learning module 1120) configured to store a plurality of REGEX patterns (e.g., REGEX A, REGEX B, REGEX N). In certain embodiments, such as when machine learning module 1120 is unable to determine the intent of an utterance based on existing REGEX patterns, machine learning module 1120 requests and/or receives a new regular expression pattern from an administrator via administrator device 1140. For example, an administrator can be a user authorized to construct regular expression patterns, such as an employee of the financial institution in the example above. Examples of administrator device 1140 include a personal computer, a laptop, a tablet computer, a smartphone, a mobile phone, a handheld device, a wireless device, a wearable device, etc. In certain embodiments, once the machine learning module 1120 receives the new regular expression pattern from administrator device 1140, the machine learning module 1120 determines whether to add the new regular expression pattern to REGEX repository 1130 and/or whether to use the new regular expression pattern as feedback to probabilistic engine 1124.

As described above, once machine learning 1120 has determined an intent associated with the utterance, machine learning 1120 outputs the intent to user interface 1110, and user interface 1110 generates a response to communicate to the user.

The components of the computer network illustrated in FIG. 1 may be connected in any suitable manner. For example, one or more networks may be used to facilitate communication between user device 1102, user interface 1110, machine learning module 1120, REGEX repository 1130, and/or administrator device 1140. In certain embodiments, one or more of these components may communicate with each other directly, indirectly via another component, or both. For example, administrator device 1140 may communicate with REGEX repository 1130 directly, indirectly via machine learning module 1120, or both, depending on the embodiment. The network(s) may include any interconnecting system capable of transmitting audio, video, signals, data, messages, or any combination of the preceding, such as all or a portion of a public switched telephone network (PSTN), a cellular network, a base station, a gateway, a public or private data network, a LAN, a MAN, a WAN, a WWAN, a local, regional, or global communication or computer network, such as the Internet, a wireline or wireless network, an enterprise intranet, or any other suitable communication link, including combinations thereof, operable to facilitate communication between the components.

Figure 2:
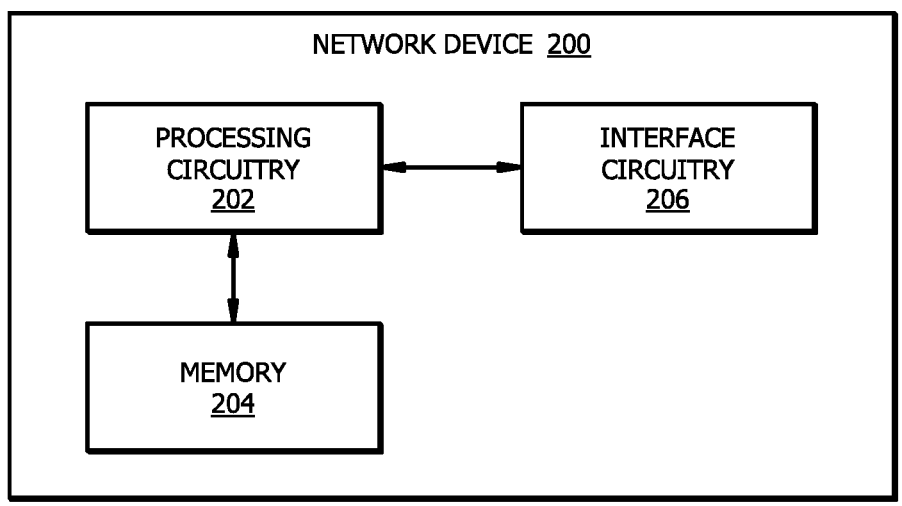
FIG. 2 illustrates an example of circuitry that may be included in the components of FIG. 1, in accordance with certain embodiments.

FIG. 2 illustrates examples of elements that may be included in one or more components of the computer network described herein, in accordance with certain embodiments. For example, any of user device 1102, user interface 1110, machine learning module 1120, REGEX repository 1130, administrator device 1140, and/or any subcomponents of any of the preceding (e.g., subcomponents 1112, 1114, 1122, 1124, 1126, and/or 1128) may include interface circuitry 206, processing circuitry 202, memory 204, and/or any other suitable elements. Interface circuitry 206 receives input, sends output, processes the input and/or output, and/or performs other suitable operation. Interface circuitry 206 may comprise hardware and/or software.

Processing circuitry 202 performs the operations of the component, for example, that executes instructions to generate output from input. Processing circuitry 202 may include hardware, software, and/or other processing circuitry. Processing circuitry 202 may be encoded in one or more tangible media and may perform operations when executed by a computer. Certain processing circuitry, such as a processor, may manage the operation of a component. Examples of processing circuitry (or a processing unit) include one or more computers, one or more microprocessors, one or more applications, and/or other processing circuitry. In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 204 (or memory unit) stores information. Memory 204 may comprise one or more non-transitory, tangible, computer-readable, and/or computer-executable storage media. Examples of memory 204 include computer memory (for example, Random Access Memory (RAM)), mass storage media (for example, a Compact Disk (CD) or a Digital Video Disk (DVD)), database, and/or network storage (for example, a server), and/or other computer-readable medium.

Figure 3:
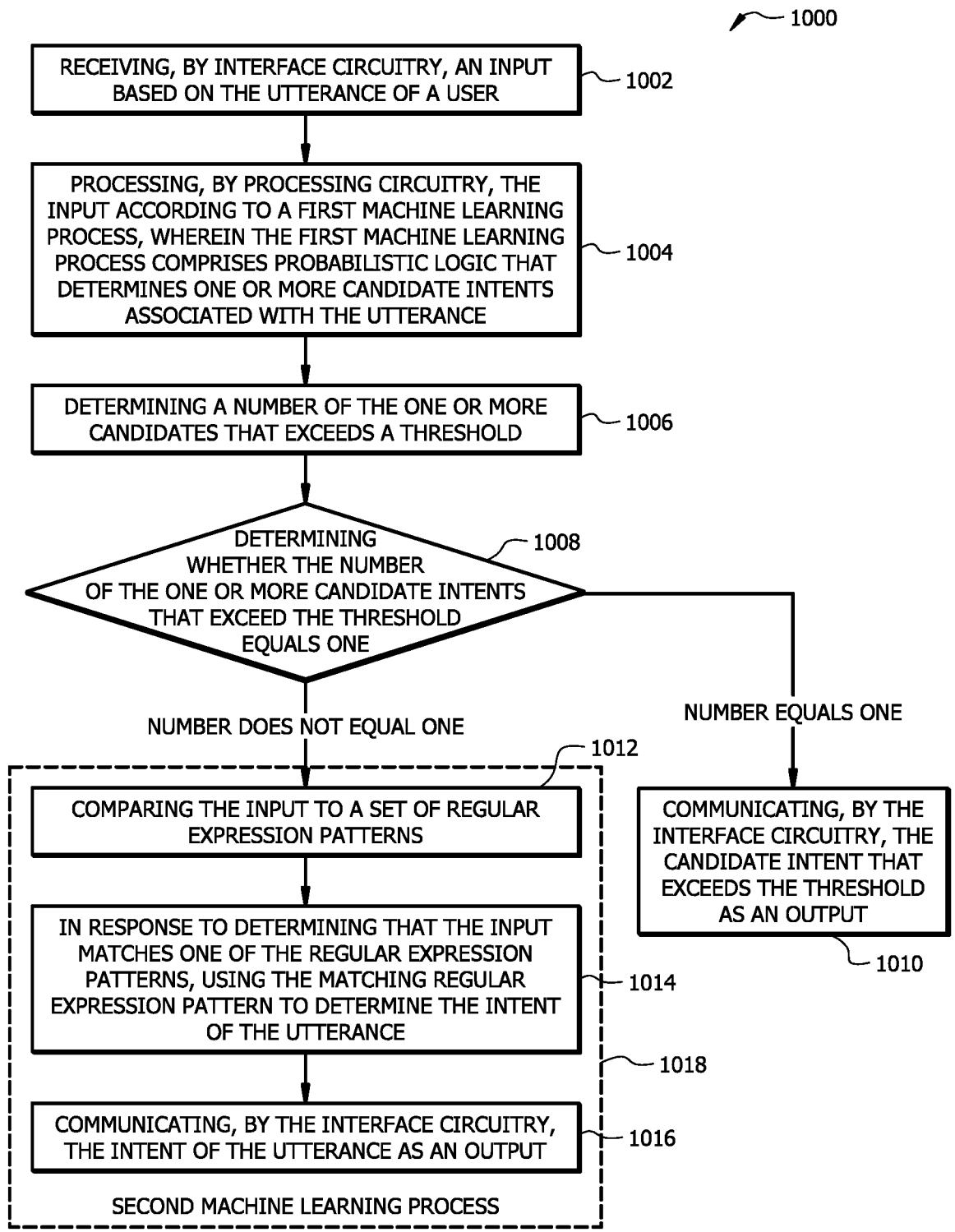
FIG. 3 illustrates an example of a method for determining an intent of an utterance based on machine learning, in accordance with certain embodiments.

FIG. 3 illustrates an example of a method 1000 for determining the intent of a user, in accordance with certain embodiments. In certain embodiments, the method may be performed by the interface circuitry 206 and processing circuitry 202 of FIG. 2. The method may begin at step 1002, when the interface circuitry 206 receives an input based on an utterance of a user. For example, this step may be performed by the user interface 1110 of FIG. 1. User interface 1110 receives the input from the user via user device 1102. Examples of utterances are speech, text, and speech that has been converted to text (i.e., translated through speech-to-text subsystem 1112).

In certain embodiments, processing circuitry 202 can receive the input from the user via interface circuitry 206. At step 1004, processing circuitry 202 processes the input according to a first machine learning process. The first machine learning process comprises probabilistic logic. Probabilistic logic refers to the use of probabilistic representations and reasoning mechanisms grounded in probability theory to yield a likelihood that an utterance represents a particular intent. By contrast, deterministic logic tests for a binary outcome regarding whether an utterance represents a specific intent. In certain embodiments, the probabilistic logic determines one or more candidate intents associated with the utterance. A candidate intent may generally refer to an intent that is being analyzed to determine a likelihood that it matches the actual intent of the user. As an example, suppose the user's utterance represents an actual intent to obtain an account balance from June fifteenth. A first candidate intent may analyze the likelihood that the user requested the account balance from June thirteenth, a second candidate intent may analyze the likelihood that the user requested the account balance from June fourteenth, a third candidate intent may analyze the likelihood that the user requested the account balance from June fifteenth, and so on.

Figure 5A:
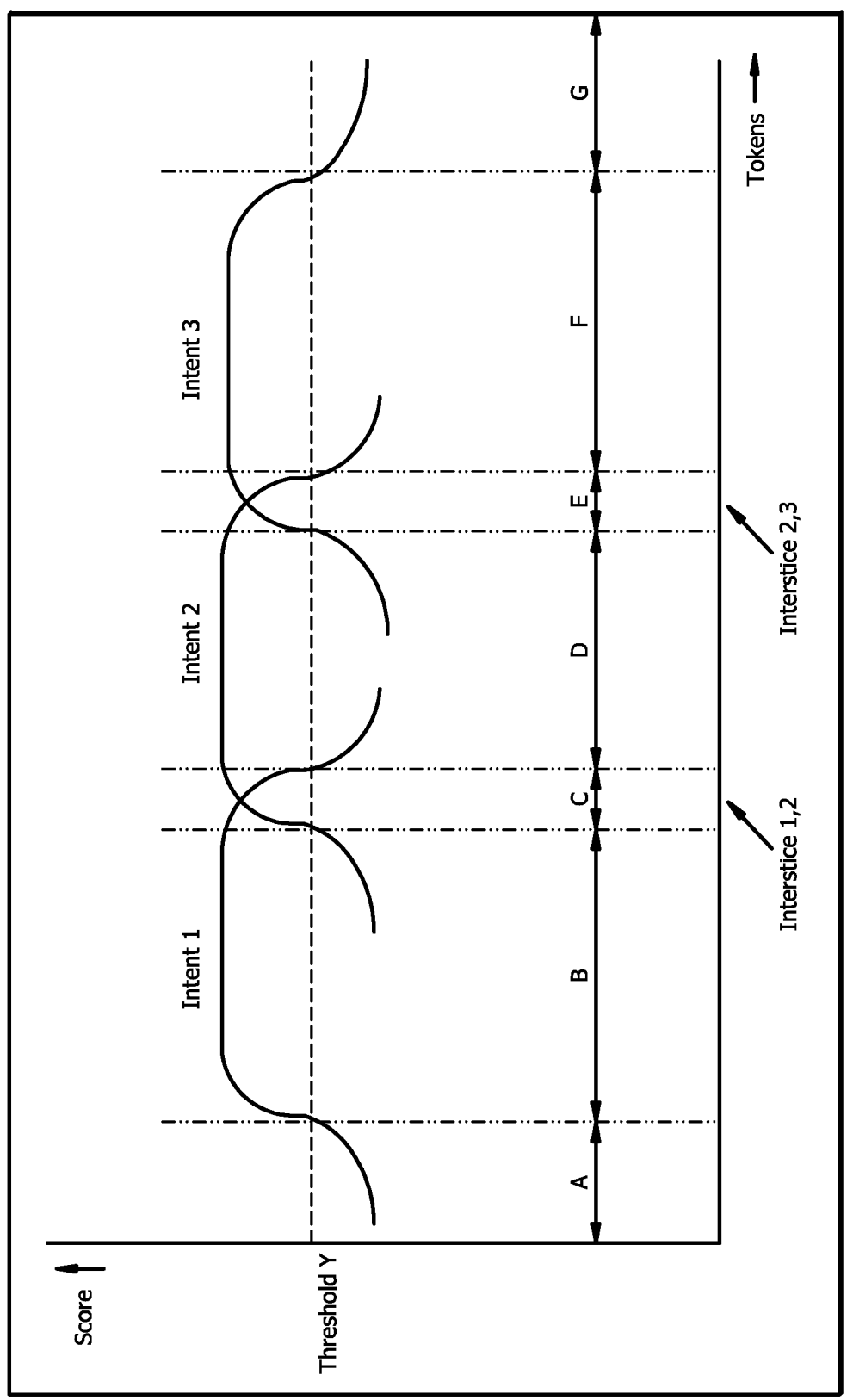
Figure 5B:
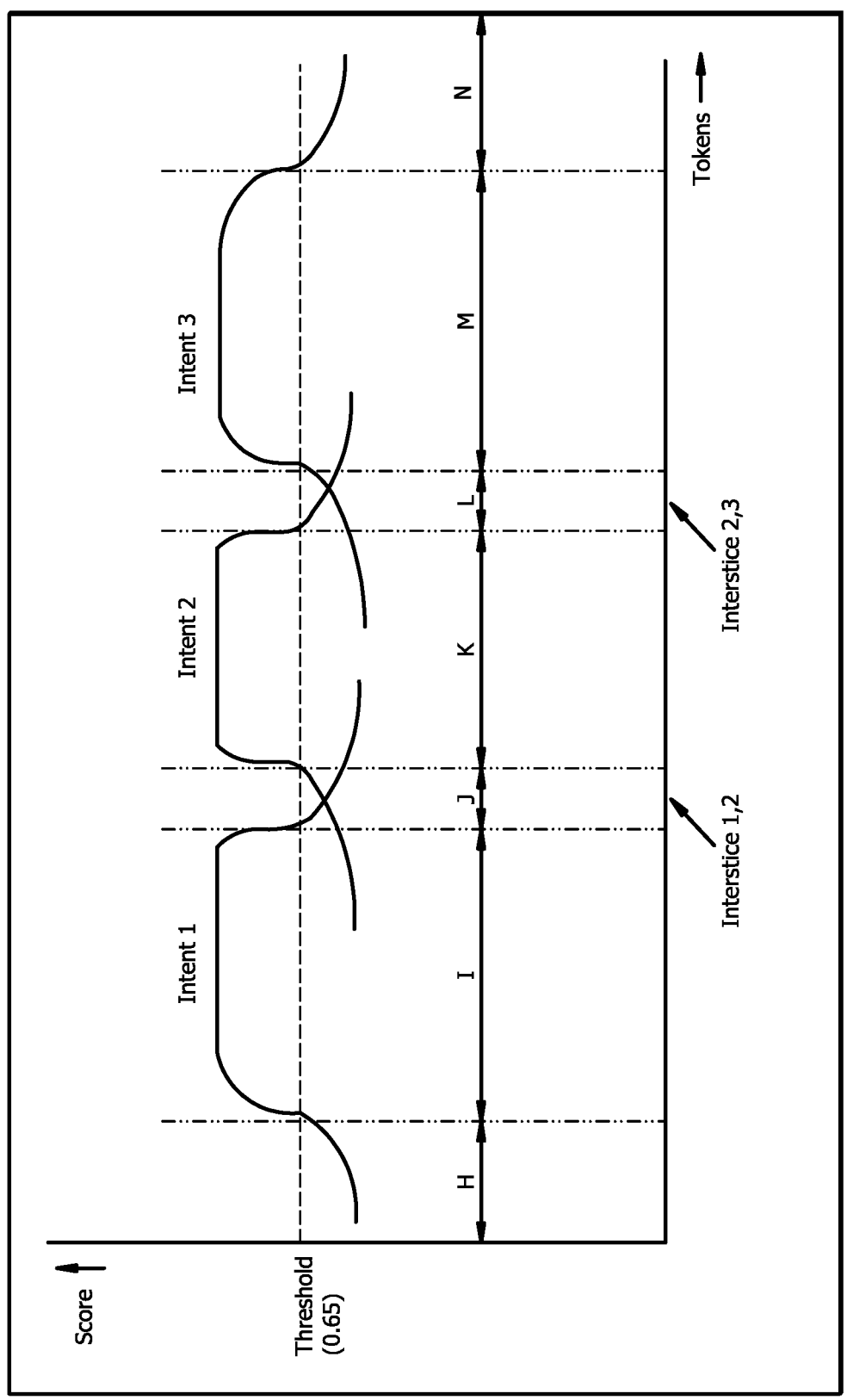

At step 1006, processing circuitry 202 determines a number of the one or more candidate intents that exceed a threshold. The threshold is associated with a pre-determined confidence level that the utterance is unambiguous. FIG. 5a illustrates an example in which the threshold is expressed as an arbitrary score, such as a numeric value represented by "Y." In this embodiment, a candidate intent may be selected if it has a score that exceeds threshold Y and no other candidate intents have scores that exceed the threshold Y. On the other hand, an ambiguity may exist where multiple candidate intents have scores that exceed the threshold Y. FIG. 5b illustrates an alternative example in which the threshold is expressed as a percentage, such as 0.65 (i.e., 65%). In this embodiment, the cumulative aggregate score of all intents is equal to 1 (i.e., 100%), and a candidate intent may be selected based on its score relative to other intents. For example, an ambiguity may exist where the sum of all the scores of the candidate intents equals 1 (or 100%), but the difference of the score between the highest scoring candidate and the next highest scoring candidate is less than 0.65 (or 65%). Other embodiments may use other values for the threshold, such as positive integer values.

In FIG. 5a, regions A and G each illustrate an example in which the number of candidate intents that exceed the threshold is zero. Regions B, D, and F each illustrate an example in which the number of candidate intents that exceed the threshold is one (i.e., only intent 1 exceeds the threshold in region B, only intent 2 exceeds the threshold in region D, only intent 3 exceeds the threshold in region F). Regions C and E each illustrate an example in which multiple candidate intents exceed the threshold (i.e., both intent 1 and intent 2 exceed the threshold in region C, and both intent 2 and intent 3 exceed the threshold in region E).

In FIG. 5b, regions H, J, L, and N each illustrate an example in which the number of candidate intents that exceed the threshold is zero. For example, regions J and L each illustrate an example in which multiple candidate intents have a similar score. Both intent 1 and intent 2 have a similar score in region J such that the difference between the value of intent 1 and the value of intent 2 is less than 65% threshold, and vice versa. Both intent 2 and intent 3 have a similar score in region L such that the difference between the value of intent 2 and the value of intent 3 is less than 65% threshold, and vice versa. Regions I, K, and M each illustrate an example in which the number of candidate intents that exceed the threshold is one (i.e., only intent 1 exceeds the threshold in region I, only intent 2 exceeds the threshold in region K, only intent 3 exceeds the threshold in region M).

At step 1008, processing circuitry 202 determines whether the number of the one or more candidate intents that exceed the threshold equals one. If only one of the candidate intents exceeds the threshold, interface circuitry 206 communicates the candidate intent that exceeds the threshold as an output at step 1010. For example, in FIG. 5*a*, if the user input falls within region B, the number of candidate intents that exceed the threshold equals one such that intent 1 would be communicated as the output. As another example, if the user input falls within region D, the number of candidate intents that exceed the threshold equals one such that intent 2 would be communicated as the output. As yet another example, if the user input falls within region F, the number of candidate intents that exceed the threshold equals one such that intent 3 would be communicated as the output. Similarly, if the user input falls within region I, K, or M of FIG. 5*b*, then intent 1, 2, or 3, respectively, would be communicated as the output. In certain embodiments, the output is communicated to a response-generating system that handles generating a response to the intent. For example, if the output indicates an intent to obtain a balance of the user's checking account, the output may be communicated to a response-generating system that determines that the balance of the user's checking account is $X. The response-generating system may communicate a response message to the user indicating that the user's checking account has a balance of $X.

If at step 1008, the number of candidate intents that exceed the threshold does not equal one, an ambiguity exists and processing circuitry 202 then proceeds to utilize the second machine learning process at step 1018. The ambiguity may occur if none of the candidate intents exceeds the threshold (e.g., regions A and G of FIG. 5*a*, or regions H, J, L, and N of FIG. 5*b*) or if more than one of the candidate intents exceed the threshold (e.g., interstice regions C and E of FIG. 5*a*).

In certain embodiments, the second machine learning process of step 1018 comprises steps 1012, 1014, and 1016. At step 1012, processing circuitry 202 compares the input to a set of regular expression patterns. For example, regular expression patterns can refer to a pattern of entities (e.g., attributes) arranged in a pre-determined order in which each entity has an associated type. The value of the entity is selected from a plurality of values corresponding to the applicable type. As an example, the entity type could be a "merchant," and the value could be "Store A," "Store B," or "Store C." As another example, the entity type could be "date," and the value could be a month, day, and year. As another example, the entity type could be a "price," and the value could be a numerical value representing dollars or other currency. As described below with respect to FIGS. 8-11, a regular expression pattern may include several entities, such as a regular expression to show my transactions from "merchant" on "date" for between "from amount" and "to amount" dollars.

At step 1014, processing circuitry 202 determines that the input matches one of the regular expression patterns and uses the matching regular expression pattern to determine the intent of the utterance. In certain embodiments, processing circuitry 202 further uses the matching regular expression pattern to determine the values of the entities associated with the intent. As an example, processing circuitry 202 may use the matching regular expression to determine the intent of obtaining an amount of money spent with a merchant on a date, and processing circuitry 202 may further determine that the merchant corresponds to Store A and the date corresponds to December 4. In certain embodiments, processing circuitry 202 obtains a matching regular expression pattern from the REGEX Repository 1130 of FIG. 1. The matching process can be based on matching within a pre-determined margin of error.

At step 1016, interface circuitry 206 communicates the intent of the utterance as an output. In certain embodiments, interface circuitry 206 utilizes the response generator 1114 of FIG. 1 to perform the action indicated by the intent. For example, where the intent indicates the action is retrieving an account balance, response generator 1114 generates the numerical value of the account balance (e.g., by retrieving from memory the account balance itself or information for calculating the account balance) and provides the value of the account balance to the user via the user device 1102.

Although FIG. 3 provides an example in which the input matches an existing regular expression pattern in step 1014, in other embodiments, it may be determined at step 1014 that the input fails to unambiguously match any existing regular expression pattern. In that case, machine learning module 1120 may skip or postpone step 1016 and may instead communicate the input and an indication that the input includes an ambiguity to an administrator (e.g., via administrator device 1140). The administrator may create a new regular expression pattern based on the input and may provide the new regular expression pattern to machine learning module 1120. Optionally, machine learning module 1120 may then return to step 1012 and may compare the input to the new regular expression pattern. Additionally, in some embodiments, machine learning module 1120 may add the new regular expression pattern to the set of regular expression patterns maintained by REGEX repository 1130. Thus, the new regular expression pattern may be available for future REGEX pattern matching.

In certain embodiments, the method of FIG. 3 may include additional techniques to determine the intent of the utterance. For example, in certain embodiments, the second machine learning process of step 1018 further comprises processing the input according to conditional random field (CRF) logic. In certain embodiments, the CRF logic is performed prior to step 1012. The CRF logic processes the input (e.g., the input that was received at step 1002), and if the CRF logic determines the intent of the input according to at least a pre-determined confidence level, the intent obtained from the CRF logic is communicated as the output (e.g., skip to step 1016). If the CRF logic fails to determine the intent of the input according to the pre-determined confidence level, the method proceeds to step 1012 to perform REGEX pattern matching. Thus, the second machine learning process may cause the input to be compared to the set of regular expression patterns based on a failure of the CRF logic to determine the intent of the input according to a pre-determined confidence level.

In certain embodiments, the method of FIG. 3 may be repeated for multiple inputs. For example, a first input may request an amount spent at Store A on Day 1 and a second input may request an amount spent at Store B on Day 2. The first and second inputs may be handled the same or differently depending on whether an ambiguity is detected. As an example, the first input may require REGEX pattern matching to determine the first intent (e.g., according to steps 1002, 1004, 1006, 1008, 10012, 1014, and 1016 of FIG. 3), whereas the second input may be sufficiently unambiguous without having to perform REGEX pattern matching (e.g., the second intent may be determined according to steps 1002, 1004, 1006, 1008, and 1010). That is, the method may receive a second input based on a second utterance of a second user (step 1002), process the second input according to the first machine learning process to determine one or more candidate second intents associated with the second utterance (step 1004), determine a number of the one or more candidate second intents that exceed the threshold (step 1006), and in response to determining (at step 1008) that the number of the one or more candidate second intents that exceed the threshold equals one, select the candidate second intent that exceeds the threshold as the second intent and communicate the second intent as a second output (step 1010).

Figure 4:
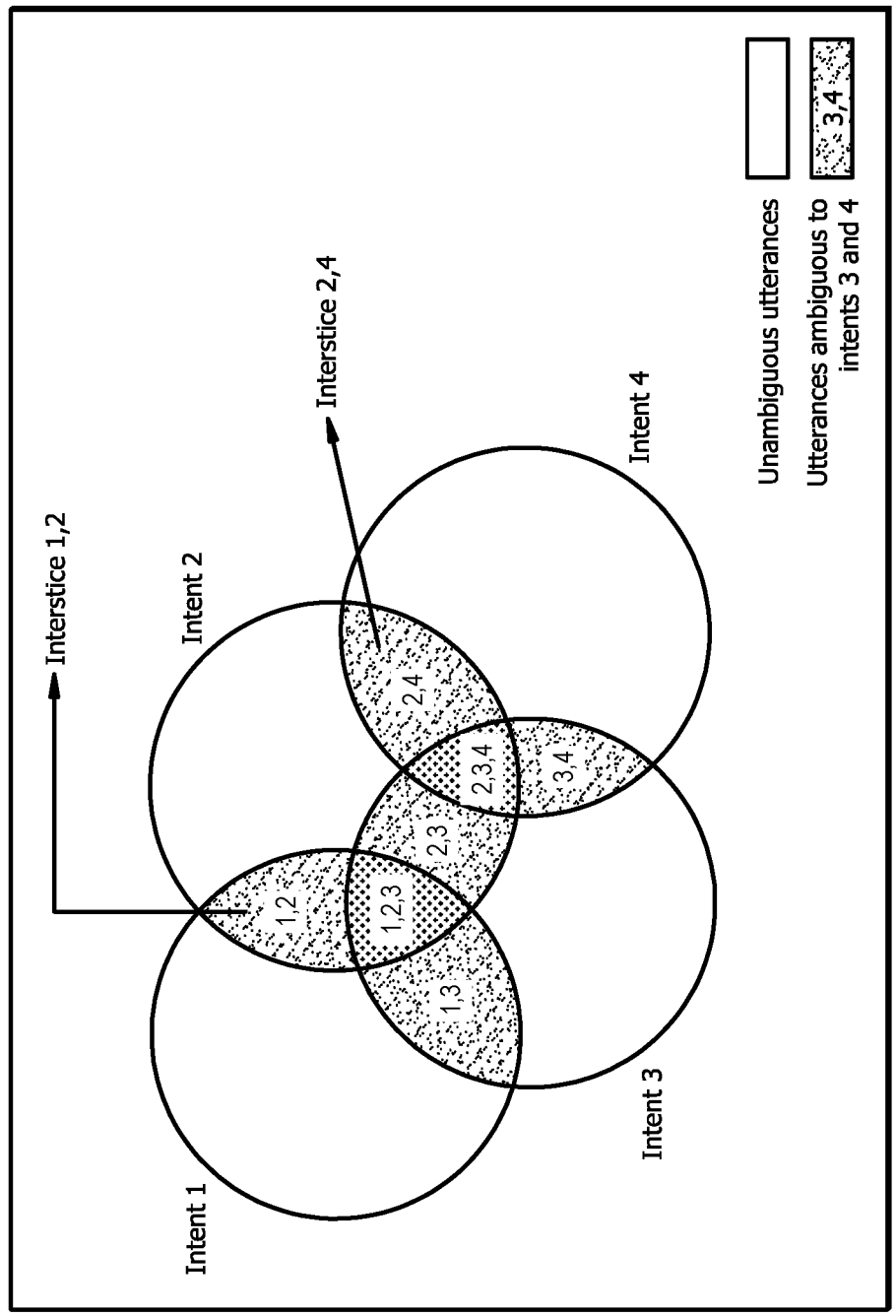
FIGS. 4, 5a, and 5b each illustrate examples of various intents and interstices that can result from ambiguities among intents, in accordance with certain embodiments.

FIG. 4 illustrates an example of various intents and the interstices which can result from ambiguities among intents, in accordance with certain embodiments. FIG. 4 illustrates, by example, four possible candidate intents to output. Interstices result where these candidate intents overlap and more than one candidate intent matches the utterance of the user. For example, Interstice 3,4 is the region where the utterance is ambiguous as to whether Intent 3 or Intent 4 should be outputted.

FIG. 5a illustrates an example of the intents and interstices in relation to a desired threshold, in accordance with certain embodiments. The threshold can be expressed as an arbitrary score, such as a numeric value represented by "Y." The threshold is associated with a pre-determined confidence level that the utterance is unambiguous. Regions B, D, and F each illustrate an example in which the intent is sufficiently unambiguous because the number of candidate intents that exceed the threshold is one (i.e., only intent 1 exceeds the threshold in region B, only intent 2 exceeds the threshold in region D, only intent 3 exceeds the threshold in region F). Regions A and G each illustrate an example in which the intent is ambiguous because the number of candidate intents that exceed the threshold is zero. Regions C and E each illustrate an example in which the intent is ambiguous because the number of candidate intents that exceed the threshold is more than one (i.e., both intent 1 and intent 2 exceed the threshold in region C, and both intent 2 and intent 3 exceed the threshold in region E). That is, sometimes multiple candidate intents exceed the threshold, resulting in interstices which create an ambiguity as to which candidate intent to output.

FIG. 5b illustrates another example of the intents and interstices in relation to a desired threshold, in accordance with certain embodiments. As shown in FIG. 5b, the threshold can be expressed as a percentage, such as 0.65 (i.e., 65%). In FIG. 5b, regions H, J, L, and N each illustrate an example in which the number of candidate intents that exceed the threshold is zero. For example, regions J and L each illustrate an example in which multiple candidate intents have a similar score. Both intent 1 and intent 2 have a similar score in region J such that the difference between the value of intent 1 and the value of intent 2 is less than the 65% threshold, and vice versa. Both intent 2 and intent 3 have a similar score in region L such that the difference between the value of intent 2 and the value of intent 3 is less than the 65% threshold, and vice versa. Regions I, K, and M each illustrate an example in which the number of candidate intents that exceed the 65% threshold is one (i.e., only intent 1 exceeds the threshold in region I, only intent 2 exceeds the threshold in region K, only intent 3 exceeds the threshold in region M). As an example, suppose intent 1 indicates whether a consumer balance is required, intent 2 indicates whether a wholesale balance is required, and intent 3 indicates whether the general description of an account balance is required. Each of intents 1, 2, and 3 is assigned a probability between zero and one after analysis based on probabilistic logic. If one of the intents is assigned a probability that exceeds the threshold, that intent is selected as the most likely intent of the user (e.g., intent 1 in region I, intent 2 in region K, or intent 3 in region M).

Figure 6:
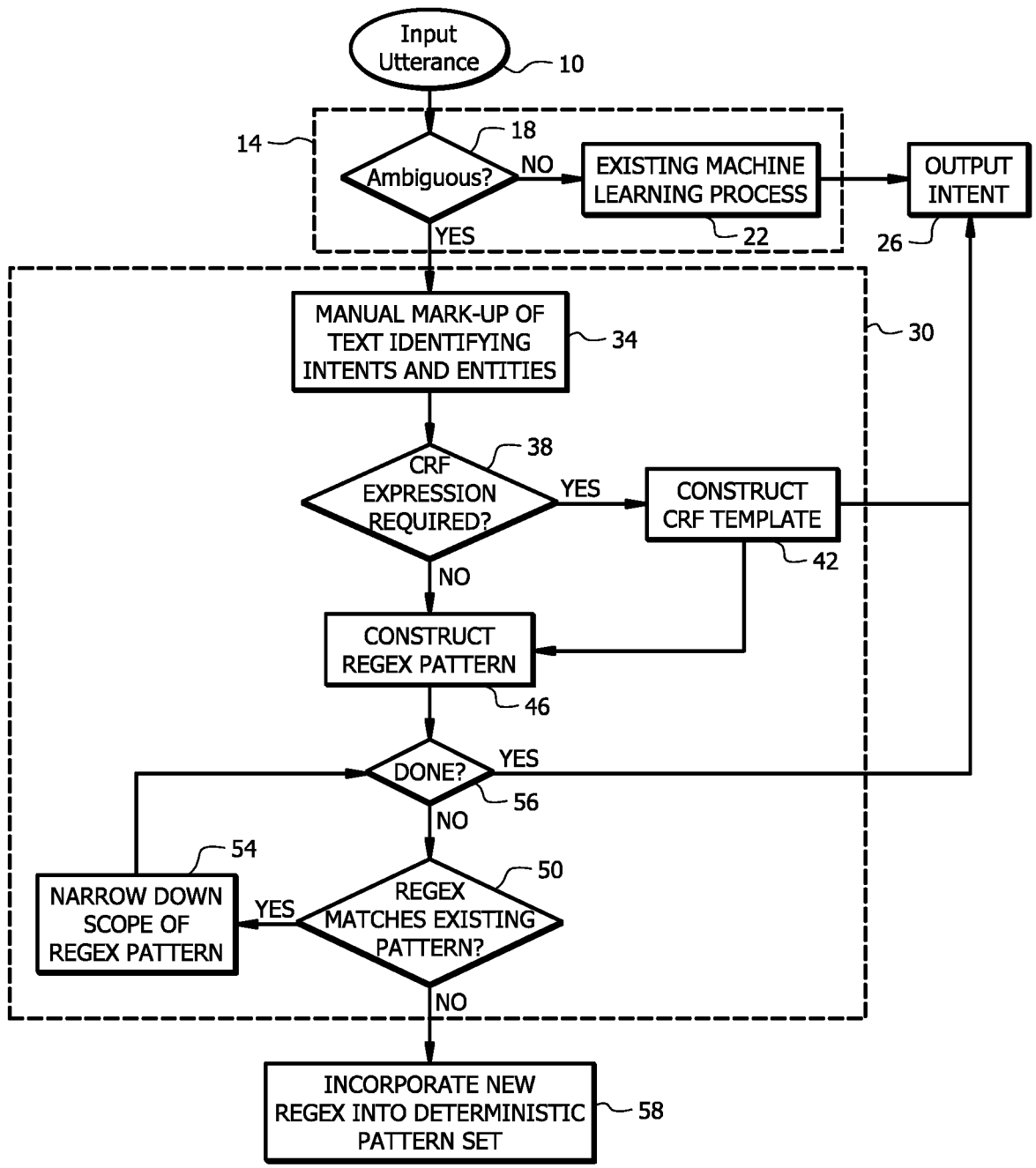
FIGS. 6-7 illustrate an example of a method for creating regular expression patterns, in accordance with certain embodiments.

FIG. 6 illustrates an example of constructing interstitial regular expressions to augment probabilistic machine learning algorithms, in accordance with certain embodiments. In certain embodiments, the system receives an input utterance of a user in step 10 and determines whether the input contains an ambiguity at step 18. Examples of techniques for detecting an ambiguity are described above with respect to FIG. 3 (e.g., step 1008) and FIGS. 4-5. If no ambiguity is detected, the system uses an existing machine learning process at step 22 to determine the intent. The intent is then outputted at step 26.

If at step 18 an ambiguity is detected, the input utterance is passed to the interstitial coverage process 30 for manual markup 34. Manual markup 34 is the process through which an administrator manually marks up the utterance in order to indicate both the intent and the entities present within the utterance. For example, the administrator can be either a business user or a subject matter expert. Manual markup 34 can be achieved through a markup tool suitable for use with minimal training. FIGS. 8-11 illustrate one way that a text markup tool could be used to assist in constructing a regular expression (REGEX) pattern at step 46. If a conditional random field (CRF) expression is required at step 38, it is created from the same markup tool at step 42 using conditional random field templating. A CRF expression is one based on sequence modeling which considers neighboring samples and takes context into account. For example, the CRF expression can be of the linear chain CRF type, which predicts sequences of labels for sequences of input samples.

In certain embodiments, if a CRF expression is not required at step 38, a regular expression pattern can be created at step 46 by using regular expression rules of construction to generate a pattern that can subsequently be used to capture both the intent and the entities of future utterances that are similar to the one that has just been processed. The process of constructing a regular expression pattern is further described in conjunction with FIGS. 8-11. If at step 50 the constructed regular expression pattern matches an existing pattern, it is narrowed at step 54 until it only applies to a small range of utterances similar to the one being processed. When this condition is met, the new regular expression pattern is added to REGEX pattern set at step 58 (e.g., the new regular expression pattern is added to the REGEX repository 1130 of FIG. 1).

Figure 7:
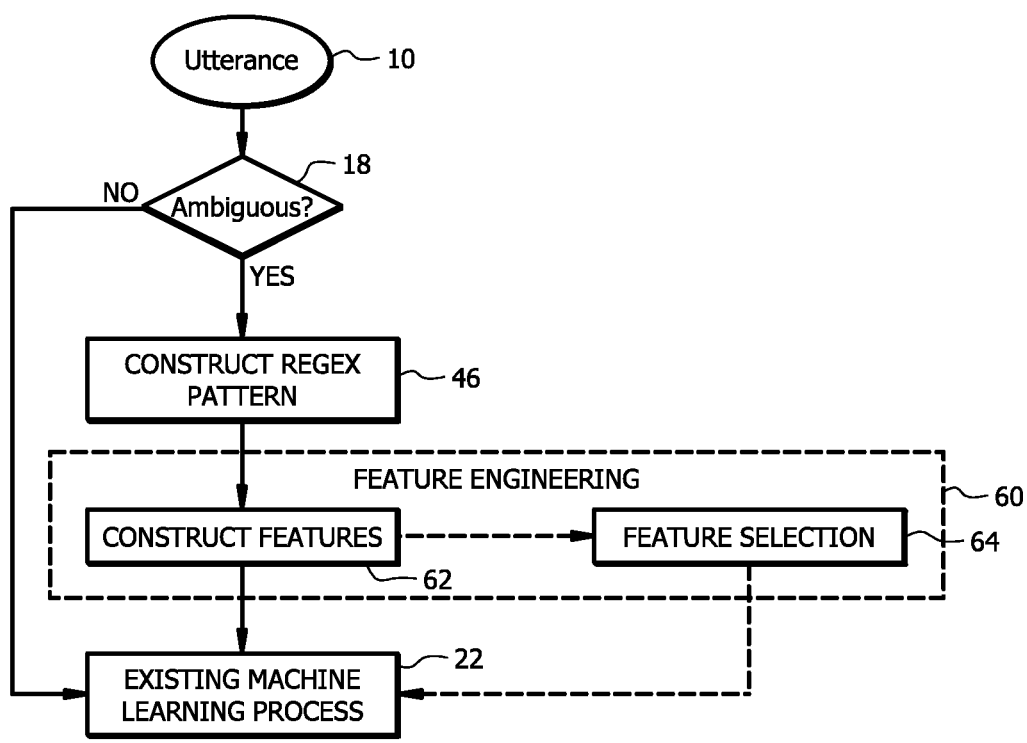
Figure 8:
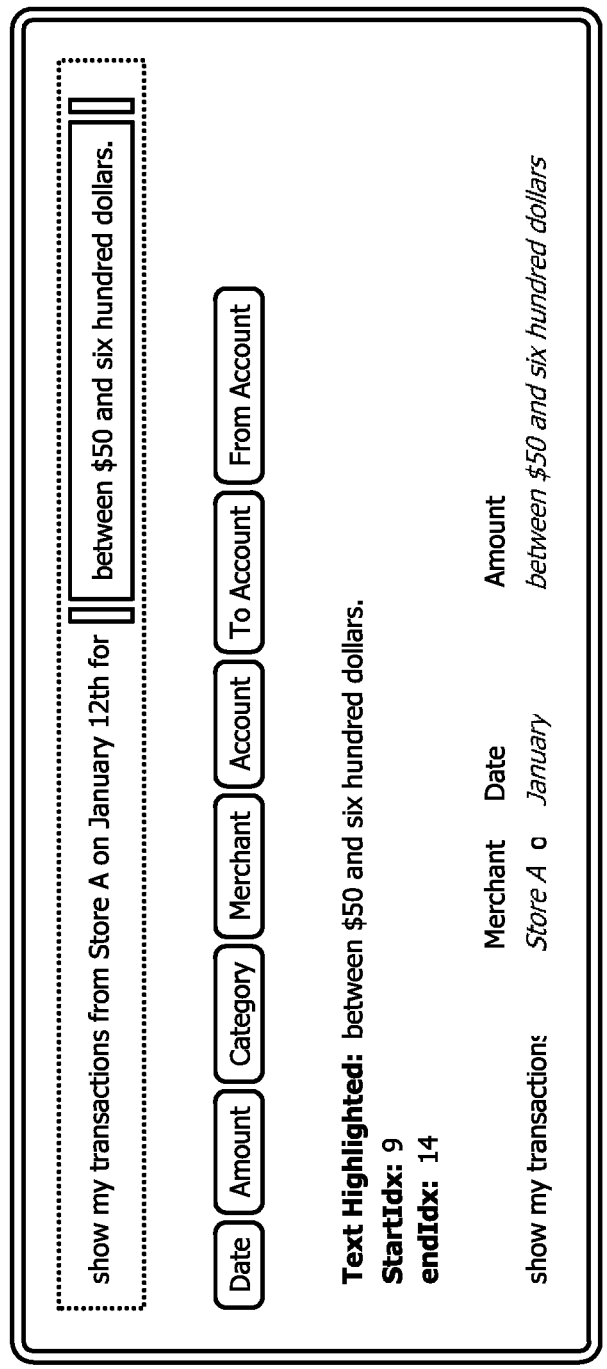
FIGS. 8-11 illustrate examples of entity types and entity values that may be included in regular expression patterns, in accordance with certain embodiments.
Figure 9:
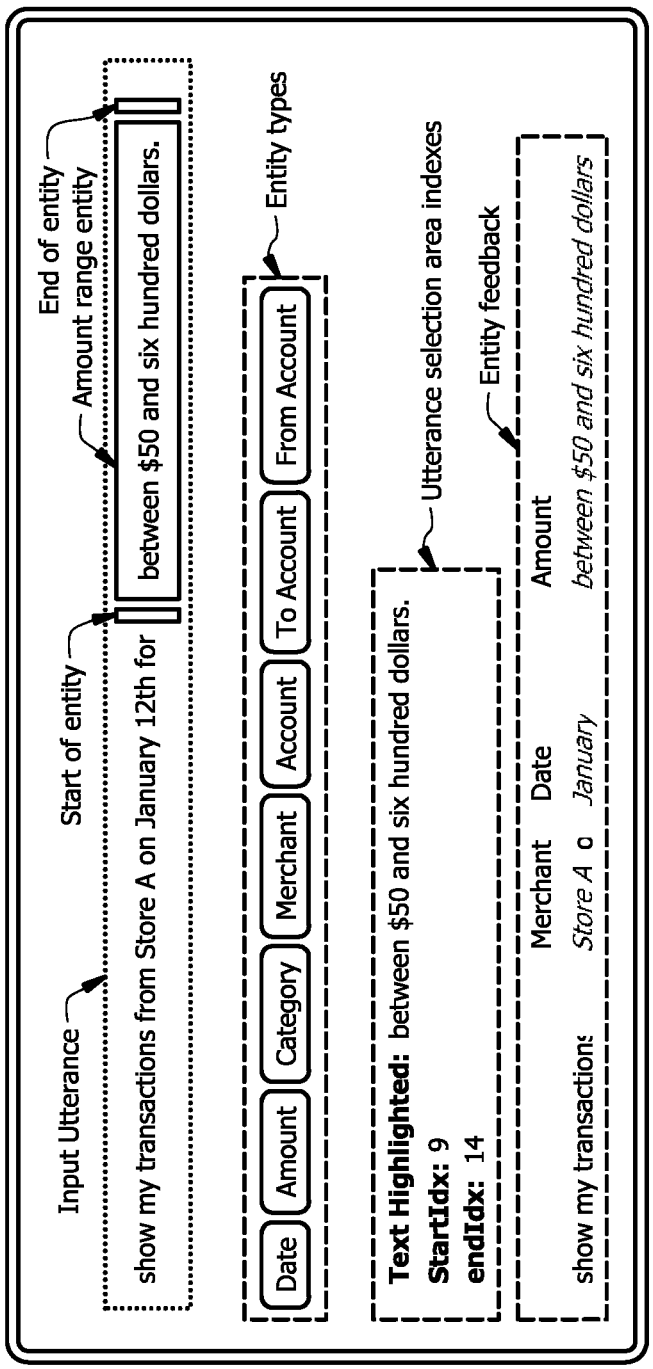
Figure 10:
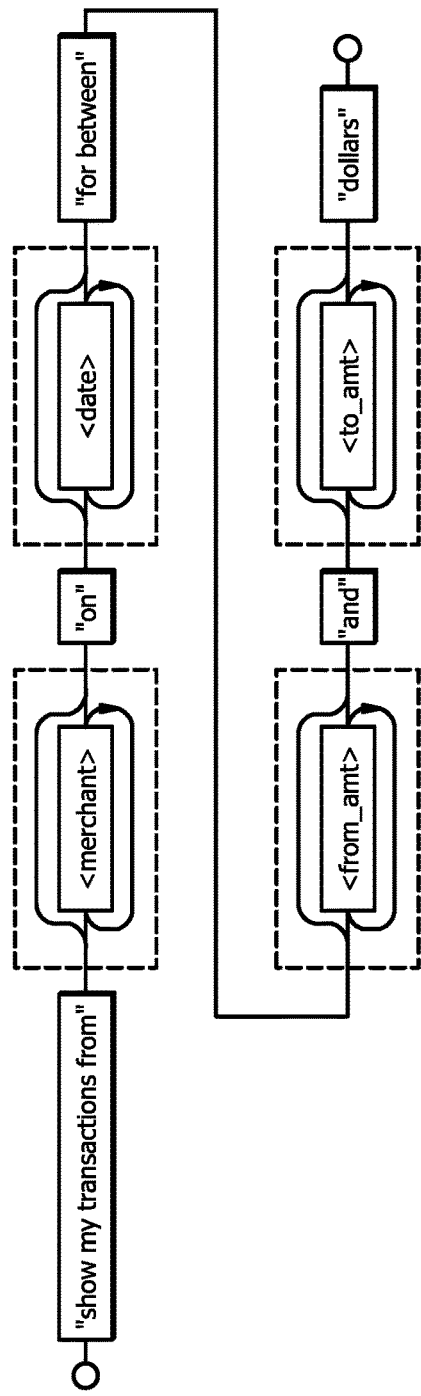
Figure 11:
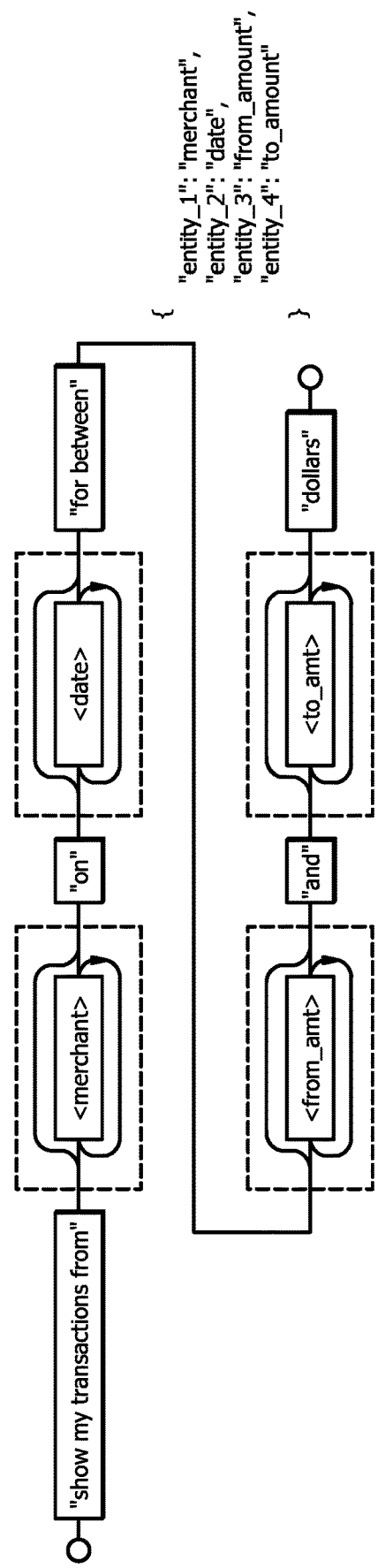

FIG. 7 illustrates an example where additional steps may be included in the method of FIG. 6, in accordance with certain embodiments. In certain embodiments, the processing circuitry 202 of FIG. 2 is operable to receive a new regular expression pattern from the administrator and add the new regular expression pattern to the REGEX repository 1130 of FIG. 1. In doing so, the processing circuitry is operable to extract entities and intents from the new regular expression pattern. For example, the deterministic engine 1128 of FIG. 2 is operable to perform feature engineering (step 60), which comprises constructing features (step 62) and selecting features (step 64). Feature Engineering (step 60) is an optional offline activity designed to improve utterance identification through optimization of the feature space. The feature space consists of all the features taken into account during machine learning. As an example, these features can comprise entity types as shown in FIGS. 8-11. When these factors include the REGEX patterns generated through administrator interaction, the new feature space, which includes the new REGEX patterns, may lead to improved association between utterances and intents.

In certain embodiments, the processing circuitry is operable to determine whether to provide the new regular expression pattern as feedback to the probabilistic engine 1124 of FIG. 1 of the first machine learning module 1122. For example, the processing circuitry may determine whether to provide the new regular expression pattern as feedback to the probabilistic engine based on performing a cross-validation analysis indicating a likelihood of the new regular expression pattern improving the accuracy of the first machine learning process. The results of feature engineering step 60 assist the processing circuitry in making the determination of whether to provide or prevent the new regular expression pattern from being provided to the probabilistic engine 1124. For example, the feature selection step 64 may analyze or test features of the new regular expression pattern and may select a subset of features likely to improve the accuracy of probabilistic logic to provide as feedback while preventing a subset of features likely to interfere with the accuracy of probabilistic logic from being provided as feedback to the probabilistic logic. In certain embodiments, providing the new regular expression pattern as feedback allows for using the new regular expression pattern as a means of generating features and subsequently using those features to support probabilistic machine learning.

FIG. 8-11 illustrates an example of a user input and various entities, in accordance with certain embodiments. In certain embodiments, regular expression patterns are used to design a new intent to output to the user. For example, regular expression patterns can refer to a pattern of entities (e.g., attributes) arranged in a pre-determined order in which each entity has an associated type. The value of the entity is selected from a plurality of values corresponding to the applicable type. As an example, the entity type could be a "merchant," and the value could be "Store A," "Store B," or "Store C." As another example, the entity type could be "date," and the value could be a month, day, and year. As another example, the entity type could be a "price," and the value could be a numerical value representing dollars or other currency. A regular expression pattern may include several entities, such as a regular expression to show my transactions from "merchant" on "date" for between "from amount" and "to amount" dollars. In certain embodiments, a regular expression pattern may be broken down to identify the starting point and ending point of the entity within an input utterance. For example, the "amount" range entity can then be indexed based on its location within the input utterance string (e.g., a range may begin with a lower bound amount and end with an upper bound amount). The input utterance can then be classified based on the values of the entity types to construct the regular expression pattern.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system, comprising:
one or more interfaces operable to receive an input based on the utterance of a user; and
processing circuitry comprising a first machine learning module and a second machine learning module, the processing circuitry operable to:
process the input using a probabilistic engine of the first machine learning module, the input processed according to a first machine learning process that determines one or more candidate intents associated with the utterance based on probabilistic logic;
determine a number of the one or more candidate intents that exceed a threshold;
in response to determining that the number of the one or more candidate intents that exceed the threshold does not equal one, process the input using a deterministic engine of the second machine learning module, the input processed according to a second machine learning process operable to use deterministic logic to:
compare the input to a set of regular expression patterns; and
in response to determining that the input matches one of the regular expression patterns, use the matching regular expression pattern to determine the intent of the utterance.

2. The system of claim 1, wherein:
the one or more interfaces are further operable to:
receive a second input based on a second utterance of a second user; and
the processing circuitry further operable to:
process the second input according to the first machine learning process to determine one or more candidate second intents associated with the second utterance; and
determine a number of the one or more candidate second intents that exceed the threshold; and
in response to determining that the number of the one or more candidate second intents that exceed the threshold equals one, select the candidate second intent that exceeds the threshold as the second intent.

3. The system of claim 1, wherein:
the one or more interfaces are further operable to:
receive a second input based on a second utterance of a second user; and the processing circuitry is further operable to:
process the second input according to the first machine learning process to determine one or more candidate second intents associated with the second utterance;
determine a number of the one or more candidate second intents that exceed the threshold;
in response to determining that the number of the one or more candidate second intents that exceed the threshold does not equal one, process the second input according to the second machine learning process, wherein the second machine learning process comprises deterministic logic that:
compares the second input to the set of regular expression patterns; and
in response to determining that the second input does not match any of the regular expression patterns, communicates the second input and an indication that the second input includes an ambiguity to an administrator.

4. The system of claim 3, the processing circuitry further operable to:
receive a new regular expression pattern from the administrator, the new regular expression pattern based on the second input; and
add the new regular expression pattern to the set of regular expression patterns.

5. The system of claim 3, the processing circuitry further operable to:
receive a new regular expression pattern from the administrator, the new regular expression pattern based on the second input;
determine whether to provide the new regular expression pattern as feedback to the probabilistic logic of the first machine learning process;
provide the new regular expression pattern to the probabilistic logic of the first machine learning process in response to determining to provide the new regular expression pattern as feedback; and
prevent the new regular expression pattern from being provided to the probabilistic logic of the first machine learning process in response to determining not to provide the new regular expression pattern as feedback.

6. The system of claim 5, the processing circuitry further operable to:
determine whether to provide the new regular expression pattern as feedback based on performing a cross-validation analysis indicating a likelihood of the new regular expression pattern improving the accuracy of the first machine learning process.

7. The system of claim 1, wherein the second machine learning process further comprises conditional random field logic and the second machine learning process causes the input to be compared to the set of regular expression patterns based on a failure of the conditional random field logic to determine the intent of the input according to a pre-determined confidence level.

8. A method, comprising:
receiving, by interface circuitry, an input based on an utterance of a user;
processing, by processing circuitry, the input according to a first machine learning process, wherein the first machine learning process comprises probabilistic logic that determines one or more candidate intents associated with the utterance;
determining a number of the one or more candidate intents that exceed a threshold;
in response to determining that the number of the one or more candidate intents that exceed the threshold does not equal one, processing the input according to a second machine learning process, wherein the second machine learning process comprises deterministic logic comprising:
comparing the input to a set of regular expression patterns;
in response to determining that the input matches one of the regular expression patterns, using the matching regular expression pattern to determine the intent of the utterance.

9. The method of claim 8, further comprising:
receiving a second input based on a second utterance of a second user;
processing the second input according to the first machine learning process to determine one or more candidate second intents associated with the second utterance;
determining a number of the one or more candidate second intents that exceed the threshold;
in response to determining that the number of the one or more candidate second intents that exceed the threshold equals one, selecting the candidate second intent that exceeds the threshold as the second intent.

10. The method of claim 8, further comprising:
receiving a second input based on a second utterance of a second user;
processing the second input according to the first machine learning process to determine one or more candidate second intents associated with the second utterance;
determining a number of the one or more candidate second intents that exceed the threshold;
in response to determining that the number of the one or more candidate second intents that exceed the threshold does not equal one, processing the second input according to the second machine learning process, wherein the second machine learning process comprises deterministic logic comprising:
comparing the second input to the set of regular expression patterns; and
in response to determining that the second input does not match any of the regular expression patterns, communicating the second input and an indication that the second input includes an ambiguity to an administrator.

11. The method of claim 10, further comprising:
receiving a new regular expression pattern from the administrator, the new regular expression pattern based on the second input; and
adding the new regular expression pattern to the set of regular expression patterns.

12. The method of claim 10, further comprising:
receiving a new regular expression pattern from the administrator, the new regular expression pattern based on the second input;
determining whether to provide the new regular expression pattern as feedback to the probabilistic logic of the first machine learning process;
providing the new regular expression pattern to the probabilistic logic of the first machine learning process in response to determining to provide the new regular expression pattern as feedback; and
preventing the new regular expression pattern from being provided to the probabilistic logic of the first machine learning process in response to determining not to provide the new regular expression pattern as feedback.

13. The method of claim 12, wherein determining whether to provide the new regular expression pattern as feedback is based on performing a cross-validation analysis indicating a likelihood of the new regular expression pattern improving the accuracy of the first machine learning process.

14. The method of claim 8, wherein the second machine learning process further comprises conditional random field logic and the second machine learning process causes the input to be compared to the set of regular expression patterns based on a failure of the conditional random field logic to determine the intent of the input according to a pre-determined confidence level.

15. One or more non-transitory computer-readable media comprising logic that, when executed by processing circuitry causes the processing circuitry to:
  receive an input based on an utterance of a user;
  process the input according to a first machine learning process, wherein the first machine learning process comprises probabilistic logic that determines one or more candidate intents associated with the utterance;
  determine a number of the one or more candidate intents that exceed a threshold;
  in response to determining that the number of the one or more candidate intents that exceed the threshold does not equal one, process the input according to a second machine learning process, wherein the second machine learning process comprises deterministic logic that:
  compares the input to a set of regular expression patterns; and
  in response to determining that the input matches one of the regular expression patterns, uses the matching regular expression pattern to determine the intent of the utterance.

16. The non-transitory computer-readable media of claim 15, the processing circuitry further operable to:
  receive a second input based on a second utterance of a second user;
    process the second input according to the first machine learning process to determine one or more candidate second intents associated with the second utterance;
  determine a number of the one or more candidate second intents that exceed the threshold;
  in response to determining that the number of the one or more candidate second intents that exceed the threshold equals one, select the candidate second intent that exceeds the threshold as the second intent.

17. The non-transitory computer-readable media of claim 15, the processing circuitry further operable to:
  receive a second input based on a second utterance of a second user;
    process the second input according to the first machine learning process to determine one or more candidate second intents associated with the second utterance;
  determine a number of the one or more candidate second intents that exceed the threshold;
  in response to determining that the number of the one or more candidate second intents that exceed the threshold does not equal one, process the second input according to the second machine learning process, wherein the second machine learning process comprises deterministic logic that:
  compares the second input to the set of regular expression patterns; and
  in response to determining that the second input does not match any of the regular expression patterns, communicates the second input and an indication that the second input includes an ambiguity to an administrator.

18. The non-transitory computer-readable media of claim 17, the processing circuitry further operable to:
  receive the new regular expression pattern from the administrator, the new regular expression pattern based on the second input; and
  add the new regular expression pattern to the set of regular expression patterns.

19. The non-transitory computer-readable media of claim 17, the processing circuitry further operable to:
  receive a new regular expression pattern from the administrator, the new regular expression pattern based on the second input;
  determine whether to provide the new regular expression pattern as feedback to the probabilistic logic of the first machine learning process;
  provide the new regular expression pattern to the probabilistic logic of the first machine learning process in response to determining to provide the new regular expression pattern as feedback; and
  prevent the new regular expression pattern from being provided to the probabilistic logic of the first machine learning process in response to determining not to provide the new regular expression pattern as feedback.

20. The non-transitory computer-readable media of claim 19, the processing circuitry further operable to:
  determine whether to provide the new regular expression pattern as feedback based on performing a cross-validation analysis indicating a likelihood of the new regular expression pattern improving the accuracy of the first machine learning process.

* * * * *